(12) United States Patent
van der Meer et al.

(10) Patent No.: US 8,956,675 B2
(45) Date of Patent: Feb. 17, 2015

(54) PROCESS FOR THERMALLY TREATING A PRODUCT WITH STEAM

(75) Inventors: Henricus J. J. van der Meer, Assendelft (NL); Paulus J. T. Bussmann, Apeldoorn (NL); Rudy M. H. Heijmans, Westervoort (NL); Jan C. Akkerman, Wageningen (NL)

(73) Assignee: Nederlandse Organisatie voor Toegepast-Natuurwerenschappelijk Onderzoek TNO, Delft (NL)

(*) Notice: Subject to any disclaimer, the term of this patent is extended or adjusted under 35 U.S.C. 154(b) by 1275 days.

(21) Appl. No.: 10/543,767

(22) PCT Filed: Jan. 30, 2004

(86) PCT No.: PCT/NL2004/000070
§ 371 (c)(1),
(2), (4) Date: Sep. 26, 2005

(87) PCT Pub. No.: WO2004/066751
PCT Pub. Date: Aug. 12, 2004

(65) Prior Publication Data
US 2006/0127553 A1 Jun. 15, 2006

(30) Foreign Application Priority Data
Jan. 31, 2003 (NL) .................................. 1022547

(51) Int. Cl.
| | | |
|---|---|---|
| A23L 1/00 | (2006.01) | |
| A23L 1/01 | (2006.01) | |
| A21D 8/06 | (2006.01) | |
| A23F 5/04 | (2006.01) | |
| A23G 1/00 | (2006.01) | |
| A23L 1/36 | (2006.01) | |
| A23L 3/16 | (2006.01) | |
| A23N 12/08 | (2006.01) | |

(52) U.S. Cl.
CPC ................. *A23L 1/0121* (2013.01); *A21D 8/06* (2013.01); *A23F 5/04* (2013.01); *A23G 1/0003* (2013.01); *A23L 1/362* (2013.01); *A23L 3/16* (2013.01); *A23N 12/08* (2013.01)
USPC ........... 426/509; 426/511; 426/634; 426/466; 426/631

(58) Field of Classification Search
USPC .......................... 426/509, 511, 634, 466, 631
See application file for complete search history.

(56) References Cited

U.S. PATENT DOCUMENTS

| | | | | |
|---|---|---|---|---|
| 2,278,483 | A | * | 4/1942 | Plews ............................ 426/631 |
| 4,456,625 | A | | 6/1984 | Durst |
| 4,911,889 | A | * | 3/1990 | Leland et al. .................... 422/26 |
| 5,075,121 | A | | 12/1991 | Desage et al. |
| 6,025,002 | A | * | 2/2000 | Holscher et al. .............. 426/511 |

FOREIGN PATENT DOCUMENTS

| | | |
|---|---|---|
| EP | 0 061 305 A | 9/1982 |
| EP | 0 308 003 A | 3/1989 |
| FR | 2 788 336 A | 7/2000 |
| FR | 2 792 810 A | 11/2000 |
| GB | 754 510 A | 8/1956 |
| GB | 2 221 830 A | 2/1990 |
| JP | 60 241 859 A | 11/1985 |
| JP | 4 311352 A | 11/1992 |
| WO | 87/06799 A | 11/1987 |
| WO | 95/20325 A | 8/1995 |

OTHER PUBLICATIONS

Perry, R.H.; Green, D.W. (1997). Perry's Chemical Engineers' Handbook (7th Edition). (pp. 2-306-2-307). McGraw-Hill. Online version available at: http://knovel.com/web/portal/browse/display?_EXT_KNOVEL_DISPLAY_bookid=48&VerticalID=0 (no month indicated).*
Machine Translation of FR 2,792,810, Lenfant, Nov. 2000.*
US PTO translation of FR 2 792 810 Lenfant, Apr. 1999.*
US PTO translation of JP 60-241859, Masanori, Dec. 1988.*
Eating Well, Psyllium in Cereal, The New York Times, [on line], Sep. 1989 [retrieved on Sep. 11, 2010]. Retrieved from the Internet: <URL: http://www.nytimes.com/1989/09/06/garden/eating-well-psyllium-in-cereal-unknown-territory.html>.*
Patent Abstracts of Japan, vol. 0171, No. 35, Mar. 19, 1993.
Patent Abstracts of Japan, vol. 0101, No. 12, Apr. 25, 1986.
International Search Report of PCT/NL2004/000070, mailed Jun. 2, 2004.
Van Deventer et al., "Stoom Droogt Meer Dan Bietenpulp", Voedingsmiddelen Technologie, Noordervliet B.V. Zeist, vol. 34, No. 9, Apr. 27, 2001, XP00101163.
Database FSTA 'Online! International Food Information Service, 1984, T. Akao et al., "Sterilization of powdery food by superheated steam", XP002256792, vol. 2, 1984, pp. 595-600 (no month indicated).

\* cited by examiner

*Primary Examiner* — Rena L Dye
*Assistant Examiner* — Chaim Smith
(74) *Attorney, Agent, or Firm* — Nixon & Vanderhye P.C.

(57) ABSTRACT

A method for thermally treating a product in order to have the product obtain the desired product properties, comprising the following steps: (a) determining the water activity value which, for carrying out the thermal treatment, is required to have the product obtain the desired properties; (b) contacting the product with water vapor, at an increased temperature and an associated saturated vapor pressure (p\*), while the temperature on the surface of the product is 80-260° C.; (c) setting a vapor pressure (p) in step (b) such that p/p\* is equal to the water activity value determined in step (a); and (d) maintaining for a time duration (t) the process conditions mentioned in steps (b) and (c) for obtaining the product with the desired product properties.

8 Claims, No Drawings

US 8,956,675 B2

PROCESS FOR THERMALLY TREATING A PRODUCT WITH STEAM

This application is the U.S. national phase of international application PCT/NL2004/000070, filed 30 Jan. 2004, which designated the U.S. and claims priority of NL 1022547, filed 31 Jan. 2003, the entire contents of each of which are hereby incorporated by reference.

BACKGROUND OF THE INVENTION

The invention relates to a method for thermally treating a product, for instance a food.

Roasting, baking, frying and sterilising are known thermal treatments to which products such as foods can be subjected. As a rule, such thermal treatments are aimed at improving the quality and the storage life of products. Roasting is for instance understood to mean a heat treatment of a food in which by means of Maillard-reactions the flavour and odour of the treated food are improved. It can also be possible to improve the colour of the food in this manner. Roasting foods is done both in continuous and batch systems, while heating takes place through direct contact with warm process air or indirectly via a heated wall. The development of flavour and odour through roasting is an extremely complicated chemical process. Reactions occur between the reducing sugars present and free amino acids, the so-called Maillard-reactions or non-enzymatic browning. The process is continued by Amadori conversion reactions and Strecker degradations. This series of different reactions may lead to a number of highly differing flavour profiles and aromas and the occurrence of undesired additional effects. In addition, in known thermal treatments of foods, eventual products are obtained whose quality and storage life often leave to be desired.

SUMMARY AND DETAILED DESCRIPTION OF THE INVENTION

Surprisingly, it has now been found that products with extraordinary quality and preservability can be obtained when the thermal treatments takes place in the presence of water vapour and under specific conditions.

Therefore, the invention relates to a method for thermally treating a product in order to have the product obtain the desired product properties, comprising the following steps:
(a) determining the water activity value which is required for carrying out the thermal treatment for having the products obtain the desired properties;
(b) contacting the product with water vapour, at an increased temperature and associated saturated vapour pressure ($p^*$), while the temperature on the surface of the product is 80-260° C.;
(c) setting a vapour pressure (p) in step (b) such that $p/p^*$ is essentially equal to the water activity value determined in step (a); and
(d) maintaining the process conditions mentioned in the steps (b) and (c) for a time duration (d) for obtaining the product with the desired product properties.

As is customary, the water activity value (aw-value) is defined as the water vapour pressure above the food in equilibrium with its surroundings at a particular temperature divided by the saturated vapour pressure of water at that particular temperature.

With the method according to the present invention, products can be roasted, baked, fried or sterilised. The products to be treated can be foods or other products, such as, for instance, manure or silt which have to be sterilised.

The aw-value to be determined corresponds to the desired product properties. When foods are concerned, for killing bacterial spores, the aw-value during the thermal treatment is preferably 0.5-1; for killing vegetative cells the aw-value during the thermal treatment is preferably smaller than 0.7 or greater than 0.8; for promoting Maillard-reactions the aw-value during the thermal treatment is preferably 0.4-0.8; for the prevention of enzymatic activity the aw-value during the thermal treatment is preferably 0-0.2; and for prevention of formation of acrylamide the aw-value during the thermal treatment will, as a rule, have to be 0.1-1. The skilled person will know from experience which aw-value is required during the thermal treatment because, as a rule, this is closely connected to the product properties of the product to be obtained.

In a preferred embodiment of the invention, the method is carried out such that the temperature on the surface of the product is 80-260° C., and the $p/p^*$ has a value of 0.15-0.95.

Therefore, the invention also relates to a method for thermally treating a product in the presence of water vapour, wherein the temperature on the surface of the product is 80-260 C.°, and the ratio of the vapour pressure used and the saturated vapour pressure ($p/p^*$) has a value of 0.15-0.95.

In a suitable embodiment of the method according to the invention, the temperature on the surface of the product is 80-220° C., whereupon the thermal treatment is stopped and the product is cooled.

Preferably, the method is carried out in the presence of water vapour and in absence of oxygen. The temperature of the water vapour is, suitably, 90-270° C., and preferably 90-230° C. Preferably, the water vapour contains superheated steam.

The foods to be treated with the method of the invention can be foods of varying nature. Suitable foods are cocoa beans, cocoa nibs, coffee beans, peanuts, nuts, soy products, (powder-form) herbs such as, for instance, basil leaves or paprika powder, (powder-form) spices such as for instance pepper, potato, starch and cereal products such as, for instance, fries and crisps, and bread, cake, meat, snack and fish products.

It will be clear to the skilled person that cocoa nibs, coffee beans, peanuts, nuts, soy products will be roasted, whereas the other products can be baked and/or fried.

Preferably, cocoa beans, cocoa nibs, coffee beans, nuts or peanuts are roasted while using the method of the invention, and more preferably cocoa beans or cocoa nibs. Bread, cake, meat, snack and fish products can be baked in an attractive manner with the method according to the invention. Preferably, the baking is carried out such that a temperature on the surface of the food is 150-250° C.

Bread—and in particular cake products can be baked in a particularly favorable manner with the method according to the invention. The fact is that, with the invention, the content of carcinogenic acrylamides can be reduced to a particular extent. This holds in particular when baking and preparing cake products, in particular gingercakes. These favorable results can be attributed to the aw-value to be obtained which is the result of the temperature and vapour pressure to be used and the presence of water vapour. By contrast, loaves of bread and cakes are baked in known processes in the presence of dry air, that is, absence of water vapour.

Therefore, the invention also relates to a method for baking a bread or cake product in which, respectively, a bread or cake product, in the presence of water vapour, is subjected to a thermal treatment, wherein the temperature on the surface of the bread or cake product is 80-260° C., and the $P/p^*$ (the ratio of the vapour pressure used and the saturated vapour pressure) has a value of 0.15-0.8, preferably 0.2-0.8, and more preferably 0.4-0.8. Therefore, during the thermal treatment, the bread or cake product has an aw-value of 0.15-0.8, preferably 0.2-0.8 and more preferably 0.4-0.8. The skilled person will understand that the bread or cake product which is subjected to the thermal treatment will, as a rule, be a bread or cake dough. Preferably, the baking is carried out such that the temperature on the surface of the bread or cake product is 150-250° C. Preferably, frying foods is, according to the invention, also carried out such that the temperature on the surface of the food is 150-250° C.

Different products such as manure, silt, (powder-form) herbs and/or (powder-form) spices can be sterilised with the method according to the invention in a particularly attractive manner.

Therefore, the invention also relates to a method for sterilising a product wherein the product in the presence of water vapour is subjected to a thermal treatment, the temperature on the surface of the product being 80-260° C. and a ratio of the vapour pressure and the saturated vapour pressure (p/p*) having a value of 0.8-0.95, preferably 0.85-0.95. Therefore, the thus sterilised products have an aw-value of 0.8-0.95, preferably 0.85-0.95. Manure and silt as well as foods can be sterilised well in this manner. In particular (powder-form) herbs and/or (powder-form) spices can be sterilised particularly attractively in this manner. Preferably, sterilising is carried out such that the temperature on the surface of the product is 110-130 C.°.

During roasting, baking or frying the different foods, the value of the ratio of the vapour pressure and the saturated vapour pressure (p/p*) is, very suitably, 0.3-0.8, preferably 0.4-0.8, and more preferably 0.5-0.8. The temperature on the surface of the food depends on the type of food, and the time duration the food is heated. Therefore, without problems, the skilled person can regulate the conditions such that the food, during the thermal treatment, has the desired temperature and aw-value.

As already stated, the temperature to be used on the surface of the food will depend on the type of food to be treated. For instance, the temperature of nuts or peanuts is preferably 140-180° C., that of coffee is preferably 180-220° C., and that of cocoa preferably 80-140° C.

As a rule, the temperature of the water vapour will at least be 1° C. higher than the temperate on the surface of the foods.

Depending on the food to be treated, the thermal treatment can be selected from the group of roasting, baking and frying.

The method of the invention can be carried out while using a batch system or a continuous system.

When the method takes place in a batch system, preferably, a pressure lower than 12 bara is used. For foods that can be thermally treated at relatively low temperatures, such as a cocoa beans, cocoa nibs, nuts and peanuts, the pressure of the water vapour in a batch system is, preferably, below 3 bara, more preferably atmospheric. For foods that usually can be thermally treated at higher temperatures, such as coffee, in a batch system, preferably, a pressure of over 3 bara is used, and more preferably a pressure of over 5 bara but below 12 bara.

In batch systems, as a rule, the food is contacted with the water vapour for 1.5 to 120 minutes.

The method according to the invention can particularly suitably be used in a continuous system, in which the food and the water vapour (steam), preferably superheated water vapour (steam), flow in the same direction or in the opposite direction.

In a suitable embodiment, the continuous system comprises a vertical shaft in which, due to gravity, the food flows downwards and is contacted with the water vapour, preferably superheated water vapour, which is blown upwards into the shaft in counter flow. In a suitable embodiment, the vertical shaft has a length of 0.5-2 meters. The shaft can be insulated or provided with a heated casing for preventing the formation of condensation on the inner wall of the shaft.

In a different suitable embodiment, the continuous system comprises a double walled tube transport within which the food with the water vapour, preferably steam, and more preferably superheated steam, as a transport medium flow in the same direction within one single tube or a series of connected tubes. The tubes are provided with a heating medium, for instance thermal oil or steam. The required energy for roasting the food is, in principle, obtained from the heating medium in the double wall and not from the transport medium directly blown in, for instance steam. The tube transport can have a length of some tens to some hundreds of meters depending on the desired final temperature of the food, the desired product properties, and a heating medium to be used.

If a continuous system is used, the time of treatment, that is the time duration of the contact between the food and the water vapour, can vary between 10 seconds and 30 minutes. This is determined by the type of continuous system that is used in the method. For instance, the roasting time can be 10-30 minutes when a vertical shaft is used within which the food and the water vapour are contacted with each other in counter flow. When, by contrast, a double walled tube transport is used within which the water vapour and the food proceed at high speed in the same direction, the roasting time can, for instance, be 10-30 seconds. The pressure used in a continuous system depends on the aw-value to be reached but is preferably below 5 bara, and more preferably below 2 bara.

In a suitable embodiment of the invention, the foods are granular or powder-form foods.

The foods which are obtained with the method according to the invention have unique product qualities. They exhibit extraordinary flavour and odour profiles, and contain particularly low contents of thermophilic spore forming bacteria. Further, they contain surprisingly low contents of carcinogenic acrylamides. Therefore, the invention also relates to a food which can be obtained with the method according to the invention. The method according to the invention also has the advantage that the risk of a fire occurring is reduced, and the odour and dust problems towards the surroundings of the process are better controlled.

The temperature on the surface of the cocoa beans or cocoa nibs is, suitably, 80-140 C.°, preferably 85-135 C.°. The temperature on the surface of pure cocoa is preferably 80-110° C. and still more preferably 85-105° C. The temperature on the surface of the cocoa beans or cocoa nibs to be used in dairy products to be sterilised is, preferably, 110-140° C., and still more preferably 115-135° C. The aw-values of the cocoa beans or cocoa nibs during roasting is preferably 0.3-0.8, more preferably 0.5-0.8, still more preferably 0.5-0.6.

Cocoa beans or cocoa nibs which have been roasted with the method according to the invention are unprecedented as to flavour profiles and aromas, while off-flavours that are naturally present can be discerned less prominently. Further, they contain a particularly low content of thermophilic spore forming bacteria. This is of importance for UHT sterilised dairy products in which cocoa has been used. It occurs that heat resistant spores from the cocoa survive the UHT treatment in the dairy industry, which, eventually, results in food decay of a dairy product intended to be preservable. As regards pure cocoa, in which the highly volatile odour and flavour components disappear in customary roasting processes, now, with a brief roasting time and at a low temperature of for instance 90° C., an optimal product can be obtained with lower germ counts and certainly free of undesired microorganisms, such as *E. coli* and *Salmonella*. Pure cocoa which can be obtained with the method according to the invention can have a germ count of below 5,000/g while the germ count of traditionally roasted cocoa, customarily, is approximately 100,000/g. Further, the cocoa beans or cocoa nibs which can be obtained with the method according to the invention contain a surprisingly low content of carcinogenic acrylamides. While cocoa roasted in the traditional manner contains, as a rule, 350 ppb or more of acrylamides, the cocoa foods according to the invention contain less than 250 ppb of acrylamides, preferably less than 200 and more preferably less than 150 ppb of acrylamides. This same phenomenon occurs, as has already been indicated hereinabove, when baking cake products, in particular gingercakes.

EXAMPLE 1

In a first experiment, cocoa nibs were continuously supplied to a vertical pipe (one meter long, 0.4 meter diameter, and a content of 125 liters), while the pipe was provided with a regulating valve at the underside. In counter flow, superheated steam at a pressure of 1.08 bara and a temperature of 165° C. was blown into the pipe from below. The roasting temperature of the cocoa nibs was 130° C., the aw-value of the cocoa nibs during roasting was 0.4 and the roasting capacity was 88 kg/hour. The roasted product had a moisture content of 1.6%, a germ count smaller than 10/g and contained no thermophilic spore formers.

EXAMPLE 2

An experiment was carried out in the same manner as described in Example 1 except that the roasting temperature of the cocoa nibs during roasting was 110° C., the cocoa nibs had an aw-value of 0.8 and the roasting capacity was 120 kg/hour. The roasted product had a moisture content of 3.36%, a germ count of 10/g and contained no thermophilic spore formers.

EXAMPLE 3

Cocoa nibs of the same type were roasted while using a continuous system comprising a double walled tube (150 meters long, and a cross-section of 150 millimeters). With steam as transport medium, the cocoa nibs were blown through the tube. The steam was blown into the tube at a pressure of 2 bara while the steam temperature was 120° C. The double wall was heated by steam at a pressure of 6 bara (160° C.). The roasting temperature of the cocoa nibs was 120° C., the aw-value of the nibs was 0.8 and the roasting capacity was 3,000 kg/hour. The roasted product had a moisture content of 3.8%, a germ count of 270/g and it contained 140 ppb of acrylamides.

EXAMPLE 4

Cocoa nibs of the same type were roasted in a batch drum of the Barth 7500-type. During the process, steam was blown into the drum to prevent the presence of air. The roasting temperature of the nibs was 115° C., the aw-value of the nibs during roasting was 0.6 and the batch size 3,500 kg/40 minutes. The roasted product had a moisture content or 4.8%, a germ count smaller than 10 per gram, it contained no detectable thermophilic spore formers and contained 155 ppb of acrylamides.

From the results shown hereinabove it will be clear that with the method according to the invention, cocoa nibs can be obtained of an extraordinarily good quality. Further, the products obtained exhibited an extraordinary flavour and aroma profile.

EXAMPLE 5

An amount of paprika powder (approximately 60 g) or an amount of basil (approximately 25 g) are placed batch-wise on a sieve plate and sterilised with superheated steam of 125° C. for 5 minutes and a pressure of, successively, 1 and 2.4 bara; leading, at equilibrium, to an aw-value of 0.43 and 0.82. The results relative to the initial contamination have been summarised in the table.

| Product | Temperature ° C. | aw-value | Killing off (log) |
| --- | --- | --- | --- |
| Basil | 125 | 0.43 | 1 |
|  | 125 | 0.82 | 3 |
| Paprika powder | 125 | 0.43 | 2 |
|  | 125 | 0.82 | 4 |

EXAMPLE 6

200 g of peanuts were batch-wise placed on a sieve plate and, for five minutes, flowed through from above with superheated steam at a temperature of 160° C. at a pressure of 1 bara; leading, at equilibrium, to an aw-value of the peanuts of 0.16. As to colour and flavour, the roasted peanuts could not be distinguished from traditionally roasted peanuts (reference). An acrylamide concentration of 0.05 mg/kg was found against a content of 0.18 mg/kg of the reference product.

EXAMPLE 7

Gingercake (700 g of dough) was baked for 50 minutes in an atmosphere of superheated steam at a temperature of 155° C. and a pressure of 3 bara; leading, at equilibrium, to an aw-value of 0.54. The baked gingercake was slightly darker than the bread traditionally baked in air (reference). A concentration of acrylamide was measured of 0.200 mg/kg, while the average literature value is 0.315 mg/kg, with a maximum of 3.190 mg/kg.

EXAMPLE 8

220 grams of oven fries were placed batch-wise on a sieve plate and flowed through from above with superheated steam with a temperature of 175° C. at a pressure of 1 bara; leading, at equilibrium, to an aw-value of the oven fries of 0.11. As to colour and flavour, the fried oven fries could not be distinguished from traditionally air-fried oven fries (reference). A concentration of acrylamide was found of 0.26 mg/kg with a content of a 0.10 mg/kg of the starting product.

From the results of, in particular, Examples 6-8 it will be clear that also with the method according to the invention, in a particularly attractive manner, foods can be baked, fried or sterilised.

The invention claimed is:
1. A method for thermally treating cocoa beans or cocoa nibs in order to have the cocoa beans or cocoa nibs have an improved quality, comprising the following steps: (a) determining a water activity value which, for carrying out the thermal treatment, is required to have the cocoa beans or cocoa nibs obtain the improved quality; (b) contacting the cocoa beans or cocoa nibs with water vapour comprising superheated steam and an associated saturated vapour pressure (p*), while the temperature on the surface of the cocoa beans or cocoa nibs is 80-140° C.; (c) setting a vapour pressure (p) in step (b) such that p/p* is equal to the water activity value determined in step (a), wherein step (c) comprises calculating a desired value for a pressure of the superheated steam according to p=aw×p* and providing the superheated steam at substantially said pressure, where aw is a water activity value; and (d) maintaining for a time duration (t) the process conditions mentioned in steps (b) and (c) for obtaining the cocoa beans or cocoa nibs with the improved quality, wherein the pressure of the water vapour is below 3 bar absolute and wherein the p/p* has a value of 0.4-0.8, and wherein the method is practiced in the absence of oxygen.

2. A method according to claim 1, wherein the cocoa beans or cocoa nibs are treated for 10 seconds-30 minutes.

3. A method according to claim 1, which is carried out in a continuous system in which the cocoa beans or cocoa nibs and the water vapour flow in the same direction or in opposite directions.

4. A method according to claim 3, which is carried out in a continuous system comprising a vertical shaft within which, due to gravity, the cocoa beans or cocoa nibs flow downwards and are contacted with water vapour which is blown upwards in the shaft in counter flow.

5. A method according to claim 3, which is carried out in a continuous system comprising a double walled tube transport within which the water vapour and the cocoa beans or cocoa nibs flow in the same direction, and the double wall comprises a heating medium.

6. A food obtainable with the method according to claim 1.

7. A method according to claim 1, wherein the method is practiced to produce cocoa nibs and cocoa beans with less than 250 ppb of acrylamides.

8. A method according to claim 1, wherein the method is practiced to produce cocoa nibs and cocoa beans having a germ count of below 5000/g.

* * * * *